US007006670B2

(12) United States Patent
Sumikawa et al.

(10) Patent No.: US 7,006,670 B2
(45) Date of Patent: Feb. 28, 2006

(54) IMAGE PROCESSING METHOD, IMAGE PROCESSING SYSTEM AND PROGRAM

(75) Inventors: Michitoshi Sumikawa, Yamato (JP); Hiroyasu Takahashi, deceased, late of Yokohama (JP); by Akiko Takahashi, legal representative, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 10/153,143

(22) Filed: May 21, 2002

(65) Prior Publication Data

US 2002/0181777 A1 Dec. 5, 2002

(30) Foreign Application Priority Data

May 30, 2001 (JP) .............................. 2001-163376

(51) Int. Cl.
*G06K 9/00* (2006.01)
(52) U.S. Cl. ...................... 382/112; 382/175; 382/184; 382/202
(58) Field of Classification Search .............. 707/104.1
See application file for complete search history.

(56) References Cited

U.S. PATENT DOCUMENTS

| 5,101,448 | A | * | 3/1992 | Kawachiya et al. | ......... 382/287 |
| 5,465,304 | A | * | 11/1995 | Cullen et al. | ............... 382/176 |
| 6,356,655 | B1 | * | 3/2002 | Sumikawa et al. | ......... 382/175 |
| 6,574,375 | B1 | * | 6/2003 | Cullen et al. | ............... 382/290 |
| 6,711,292 | B1 | * | 3/2004 | Wang | ......................... 382/199 |
| 6,909,805 | B1 | * | 6/2005 | Ma et al. | .................... 382/170 |

* cited by examiner

*Primary Examiner*—Jingge Wu
*Assistant Examiner*—Robert Tarcu
(74) *Attorney, Agent, or Firm*—John L. Rogitz

(57) ABSTRACT

A technique which can generate stable virtual page marks even in a non-OCR form to stably identify the form. Key segments which can be stably detected within a form are predefined for the detection of virtual page marks, and the virtual page marks (circumscribed rectangle) are generated on the basis of the key segments. Redundancy is bestowed on the detection of the key segments, and substitute segments are defined so as to generate the virtual page marks on the basis of them even in a case where the key segment has failed to be detected due to a stain, a partial lack or the like.

16 Claims, 11 Drawing Sheets

IMAGE PROCESSING METHOD, IMAGE PROCESSING SYSTEM AND PROGRAM

FIELD OF THE INVENTION

The present invention relates to a processing method, processing system and program for image data. More particularly, it relates to techniques which are effective when applied to a process for identifying a form or the specification of a field position such as character frame, in the case where data processing of OCR (optical character reader or optical character recognition) or the like is executed on the basis of image data such as bitmap data.

BACKGROUND OF THE INVENTION

In specifying the position of a character frame or the like on an image as a process for identifying a "form" (which is a document, such as written application or written contract, having prescribed formal matters) and recognizing characters, it is possible to adopt (1) a scheme wherein page marks or reference marks are employed as reference, (2) a scheme wherein, when a scanner has the function of detecting the edges of a form with a black background, the edges are employed as reference, and (3) a scheme wherein black character frames are individually detected and then matched with a predefined frame.

With the scheme (1), however, the page marks or reference marks are indispensable to the form, to pose such a large number of limitations that a region usable by a user becomes smaller in area. Another drawback is that this scheme cannot cope with a form in which the page marks or reference marks are not existent. The scheme (2) has the drawback that it is not applicable without the expensive scanner dedicated to OCR as is furnished with the special function. The scheme (3) has the drawback that, since not only horizontal segments, but also vertical segments need to be extracted as features in order to detect the black character frame, a processing speed lowers.

Another drawback is that, since the image itself is preprocessed by a skew correction so as to establish a state having quite no skew, the processing speed lowers still further. Especially with a scheme wherein the form is identified using its contents, when a skew or a positional deviation exists, an analysis logic is liable to become complicated, and the processing speed tends to lower.

One method for solving these drawbacks is, for example, a technique according to the inventor' invention disclosed in Japanese Patent Laid-Open No. 143986/1999. With the technique, the following processing steps are executed: (1) First, horizontal segments are extracted from a bitmap image. (2) A rectangle circumscribed to the horizontal segments (a circumscribed oblong) is generated. (3) A skew is theoretically corrected. (4) Subsequently, by referring to form definition structures registered beforehand, candidates for a form are narrowed down on the basis of the circumscribed rectangle, and candidates for the form are narrowed down on the basis of the information of the horizontal segments, thereby to identify the form. (5) Thereafter, characters in a region corresponding to the input field of the identified form are recognized, and the recognized characters are generated from the bitmap image. The information items of the segments and circumscribed rectangles of respective forms are registered in each form definition structure beforehand.

Owing to the technique, advantages as stated below have been brought forth. Even in a case where the form has no page marks or no reference marks, and where a scanner is incapable of detecting the edges of the form, it is permitted to specify a character frame (input field) and to recognize characters. Since the bitmap images can be compared with reference to the circumscribed rectangle formed only of the horizontal segments recognizable at high speed, the speed of the process for identifying the bitmap image can be heightened. Further, since mapping to an ideal image is realized without subjecting the image itself to a skew correction, the speed of the process for identifying the bitmap image can be heightened. Still further, since the four corners of the circumscribed rectangle can be set as virtual page marks, a logic for detecting the character frame with reference to the page marks in the prior art can be diverted. Yet further, since the definition information items of circumscribed rectangles and horizontal segments can be added to existing form definition structures, the information items of the form definition structures in the prior art can be utilized as they are, and a burden on an operator who creates the form definition structures can be lightened.

Meanwhile, as a premise for applying the aforecited technique disclosed in Japanese Patent Laid-Open No. 143986/1999, the direction of the bitmap image needs to be a direction in which the character recognition is possible. More specifically, in a case where the bitmap image is rotated, e.g., 90 degrees or 270 degrees relative to the recognizing direction, the operation of rotating the image into the direction in which the characters can be normally recognized needs to be considered. By way of example, the following processing is executed in a system which is practiced by the inventors: (1) First, the original form is rotated 90 degrees. (2) Horizontal segments are detected, and the form is identified by utilizing the information of the segments. (3) When the form identification is OK, it is followed by recognition processing. (4) When the form identification is NG, the original form is rotated 270 degrees. (5) Horizontal segments are detected, and the form is identified by utilizing the information of the segments. (6) When the form identification is OK, it is followed by recognition processing, and when it is NG, a form error is judged. Incidentally, assumed for the process is the form in which characters are laterally written on an oblong sheet of paper of A4-format or the like, and data in the case where the form is scanned in parallel with the shorter side of the sheet of paper by a facsimile or the like. Therefore, the example corresponds to a case where the rotational direction of the form is limited to 90 degrees or 270 degrees.

In this manner, the drawbacks attendant upon the schemes (1)–(3) stated before can be solved by the aforecited technique or the process of the image rotation operation practiced by the inventors. Problems to be explained below, however, are involved in the aforecited technique or the process of the image rotation operation practiced by the inventors.

With the aforecited technique, it is premised that forms designed for the OCR process (forms for OCR) are chiefly employed. In the form for OCR, the character input frame (input field) is designated by thick lines, and ordinarily characters are enclosed with thick rectangles one by one. In the horizontal segment detection in the technique, the segments can be stably detected as long as the form for OCR is employed. Premising that the horizontal segments can be stably detected, it is reasonable for stabilizing the generation of the virtual page marks (circumscribed rectangle) that the outermost horizontal segments which constitute a circumscribed rectangle of larger area are selected as key segments. Therefore, the technique is premised on the employment of the form for OCR, and it adopts an algorithm in which the circumscribed rectangle (virtual page marks) is generated using the outermost horizontal segments as the key segments. That is, the technique does not take into consideration an algorithm which is based on the horizontal segments stably detectable within the form.

Therefore, in case of employing a non-OCR form which is not designed for the OCR, the technique involves the problem that, in a case where the key segments for determining the circumscribed rectangle cannot be detected on account of a blur, a skew, the lack or stain of a form end, a fold or the like, or where the key segment lacks at a part (particularly on an outer side), stable virtual page marks (circumscribed rectangle) cannot be generated, so erroneous virtual page marks are generated. Especially in a case where a clear area which is an empty area for coping with the skew or expansion/contraction of the form is nonexistent or slight at the peripheral part of the form, the necessary horizontal segment lacks due to a facsimile header in the received data of an image transmitted by a facsimile or the like. In consequence, the form to be essentially recognized is not recognized, and a form identification error develops.

Moreover, a long time period is generally expended on the process for detecting the horizontal segments over the whole form or the process of the rotation operation of the whole image. With the technique of the image rotation operation explained before, one time of rotation operation and segment detection process must be inevitably executed each time one form is dealt with, and two times of rotation operations and segment detection processes must be executed in the worst case. It is always required to heighten a processing speed, and it is desired to adopt an algorithm which can realize a higher processing speed by omitting any wasteful operation.

A non-limiting object of the present invention is to provide a technique which can generate stable virtual page marks even in a non-OCR form so as to stably identify the form.

Another non-limiting object of the present invention is to provide a technique which bestows redundancy on the detection of horizontal segments and can generate stable virtual page marks even when the detection of the horizontal segments is difficult.

Further non-limiting objects of the present invention are to provide a technique which detects the direction of a form rotation operation beforehand, and to provide a technique which can enhance a processing speed by suppressing the number of times of the rotation operations and the segment detection processes of the whole form to the minimum.

SUMMARY OF THE INVENTION

According to the present invention, on the supposition that horizontal segment information cannot be correctly detected in case of a non-OCR form, key segments which can be stably detected within a form are predefined for the detection of virtual page marks, and the virtual page marks (circumscribed rectangle) are generated on the basis of the key segments. redundancy is bestowed on the detection of the key segments, and substitute segments are defined so as to generate the virtual page marks on the basis of them even in a case where the key segment has failed to be detected due to a stain, a partial lack or the like.

Owing to such contrivances, the virtual page marks can be stably generated even in the non-OCR form, so that the capability of form identification is enhanced. Since the detection of the key segments is redundant, the probability of a form identification error can be lowered.

The key segment to be selected shall meet the following conditions: (1) The segment which is thick enough to endure the blur of the form. (2) The segment which lies at a position sufficiently spaced from the peripheral edge of the form, and which is accordingly stable against the skew of the form or the lack of a form end. (3) The segment which does not overlap the fold of the original sheet of paper of the form.

Further, according to the present invention, the following form rotation process is sometimes executed: (1) Horizontal segments in a partial region of the original form are detected without rotating the form, and the rotational direction of the form is discriminated by utilizing the information of the detected segments. (2) If the discrimination of the rotational direction is OK, the routine proceeds to a rotation process, and if it is NG, a form error is judged. (3) The original form is rotated a discriminated rotational angle. (4) Horizontal segments are detected, and the form is identified by utilizing the information of the detected segments. (5) If the form identification is OK, a recognition process is executed, and if it is NG, a form error is judged.

Owing to such a form rotation process, each of all the forms merely undergoes one time of rotational direction discrimination process, one time of rotation operation and one time of segment detection process before it is subjected to the recognition process. In this way, a processing speed can be remarkably enhanced as compared with that in the prior art in which each form sometimes undergoes two times of rotation operations and segment detection processes. The rotational direction discrimination process need not examine the whole form image, but it suffices to examine a region which is about 1/10 of the whole image. Therefore, any excessive processing time period is not expended on the rotational direction discrimination process in the present invention.

The present invention can be grasped, not only as a method or a system, but also as a program.

BRIEF DESCRIPTION OF THE DRAWINGS

FIG. 4 is a diagram showing an example of a form for use in this embodiment.

FIG. 5 is a conceptual diagram showing an example of a result obtained after the form in FIG. 4 has undergone segment extraction at a step 301.

FIG. 9 is a conceptual diagram of a circumscribed rectangle which has been created by a process for forming the circumscribed rectangle.

FIG. 11 is a diagram showing an example of a display presented after a process for selecting the discriminatory segments has ended.

DETAILED DESCRIPTION OF A PREFERRED EMBODIMENT

Figure 1:
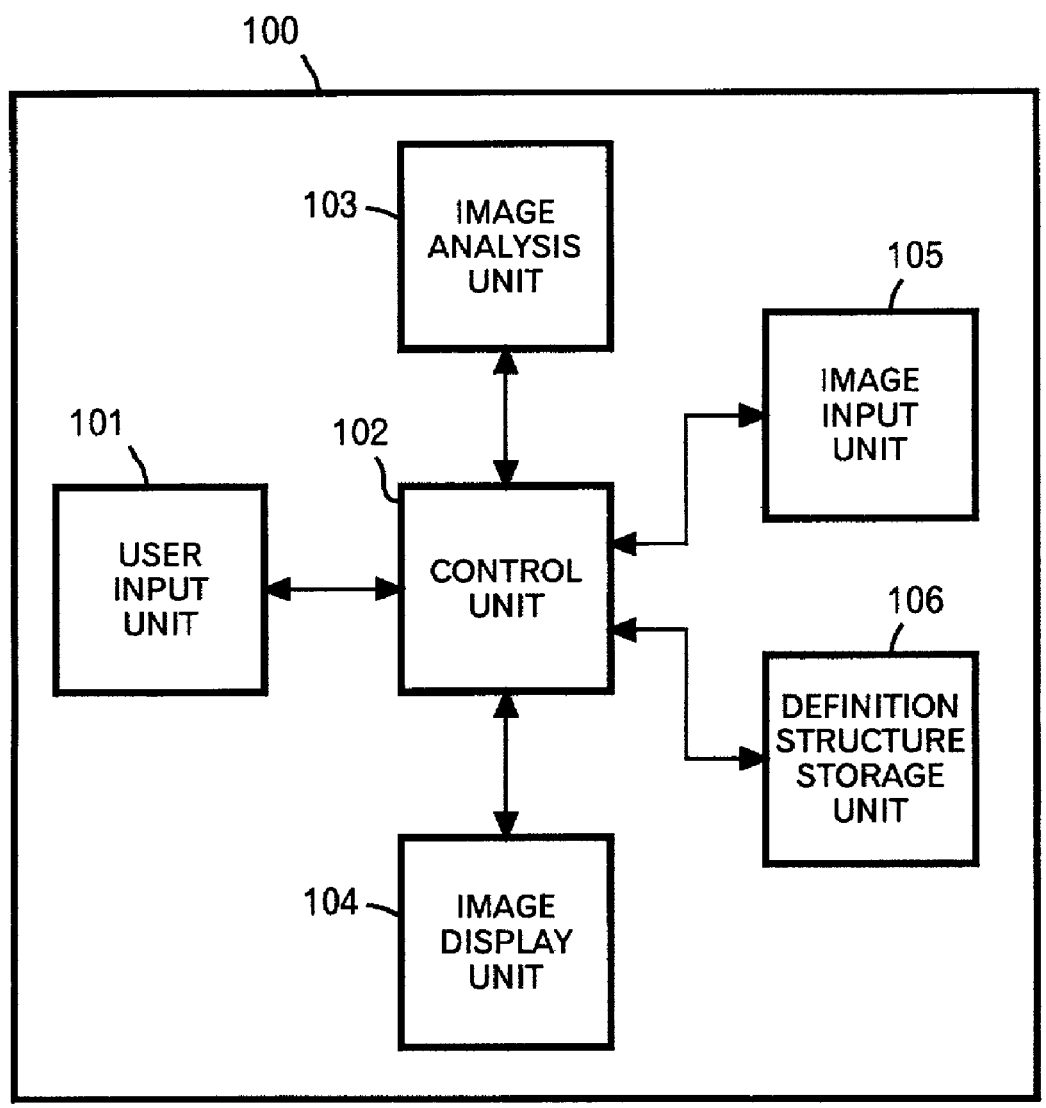
FIG. 1 is a block diagram functionally showing an example of an image processing system which is an embodiment of the present invention.

Now, an embodiment of the present invention will be described in detail with reference to the drawings. The present invention, however, can be performed in a large number of modifications and alterations and shall not be narrowly construed by restricting it to contents stated in the embodiment. Incidentally, the same numerals shall be assigned to identical or like constituents throughout the embodiment.

A method or a system will be chiefly referred to in the ensuing description of the embodiment, but as obvious to one skilled in the art, the present invention can be performed as a computer-usable program in addition to the method or system. Accordingly, the present invention can be embodied as hardware, as software, or as the combination of software and hardware. Any of computer-readable media which include a hard disk, a CD-ROM, an optical storage device and a magnetic storage device, can be exemplified as a medium for recording the program.

A general computer system can be employed as a computer system for use in this embodiment. The computer system includes various computers such as a personal computer, a workstation and a mainframe computer. Such computer systems may be connected to one another by a LAN (local area network) or may well be connected through the Internet. The interconnected computer systems may well implement the method of the present invention to be described later, in distributed fashion.

In the general computer system, a central processing unit (CPU), a main storage device (main memory: RAM), a nonvolatile storage device (ROM), etc. are connected to one another through a bus, and a coprocessor, an image accelerator, a cache memory, an input/output control device (I/O), etc. are also connected to the bus. An external storage device, a data input device, a display device, a communication control device, a speech output device, etc. are connected to the bus through a suitable interface. Hardware resources which are ordinarily included in the computer system can be further disposed. A semiconductor storage device, such as hard disk device, magnetooptic storage device, optical storage device or flash memory, can be exemplified as the external storage device. The data input device includes an input device such as keyboard, a pointing device such as mouse, a pen input device, a tablet device, an image reader such as scanner, a speech input device, or the like. Incidentally, data may well be inputted as the image data of a bit map or the like by receiving a signal from a facsimile. Alternatively, image data attached to electronic mail or the like may well be inputted. A CRT, a liquid-crystal display device or a plasma display device can be exemplified as the data display device.

An operating system should desirably be one which supports the GUI multiwindow environment of X-WINDOW SYSTEM (trademark of MIT) or the like as standard, such as WINDOWS (trademark of Microsoft Corp.), OS/2 (trademark of IBM Corp.), or AIX (trademark of IBM). The present invention, however, is not restricted to any specified operating system environment.

FIG. 1 is a block diagram functionally showing an example of an image processing system which is one embodiment of the present invention. The image processing system 100 of this embodiment includes a user input unit 101, a control unit 102, an image analysis unit 103, an image display unit 104, an image input unit 105, and a definition structure storage unit 106.

The user input unit 101 functions to accept from a user the inputs of instruction for the start/end of a process, the inputs of coordinate values on a screen through a pointing device such as mouse, and so forth, and to transfer them to the control unit 102. The control unit 102 governs various controls. The image analysis unit 103 analyzes image information held in the image input unit 105. By way of example, the image analysis unit 103 extracts a segment within an image and derives coordinate values etc. for specifying the detected segment. The image display unit 104 displays on the display screen the image information of a form image or the like held in the image input unit 105, and the positional information and attribute information of fields stored in the definition structure storage unit 106. The image input unit 105 holds the image information of the form image or the like inputted from a facsimile, a scanner or the like, and transfers the image information to the control unit 102. Definition structures to be explained later are stored in the definition structure storage unit 106. The detailed functions of the respective functional blocks will be detailed later.

The functional blocks shown in FIG. 1 are logical ones. It is not signified that the functional blocks are respectively implemented by unitary hardware or software, but they can be implemented by composite or common hardware or software.

Next, the operation of the system of this embodiment will be described. Although the application of the present invention to OCR (optical character recognition) will be exemplified below, the present invention is not restricted to the OCR only, but it is also applicable to the general recognition or identification of a bitmap image. the image data is not restricted to the bitmap image, but the present invention is also applicable to image data expressed by another format such as PostScript format or PICT format.

In recognizing characters, OCR software having a form identification function identifies a form in which the characters are actually entered, by the use of a file (hereinafter, called "form definition structure") in which the positions of character frames, character attributes, etc. are described beforehand, and it specifies a character field being a place where the characters are entered, whereupon it recognizes/codes the characters.

Figure 2:
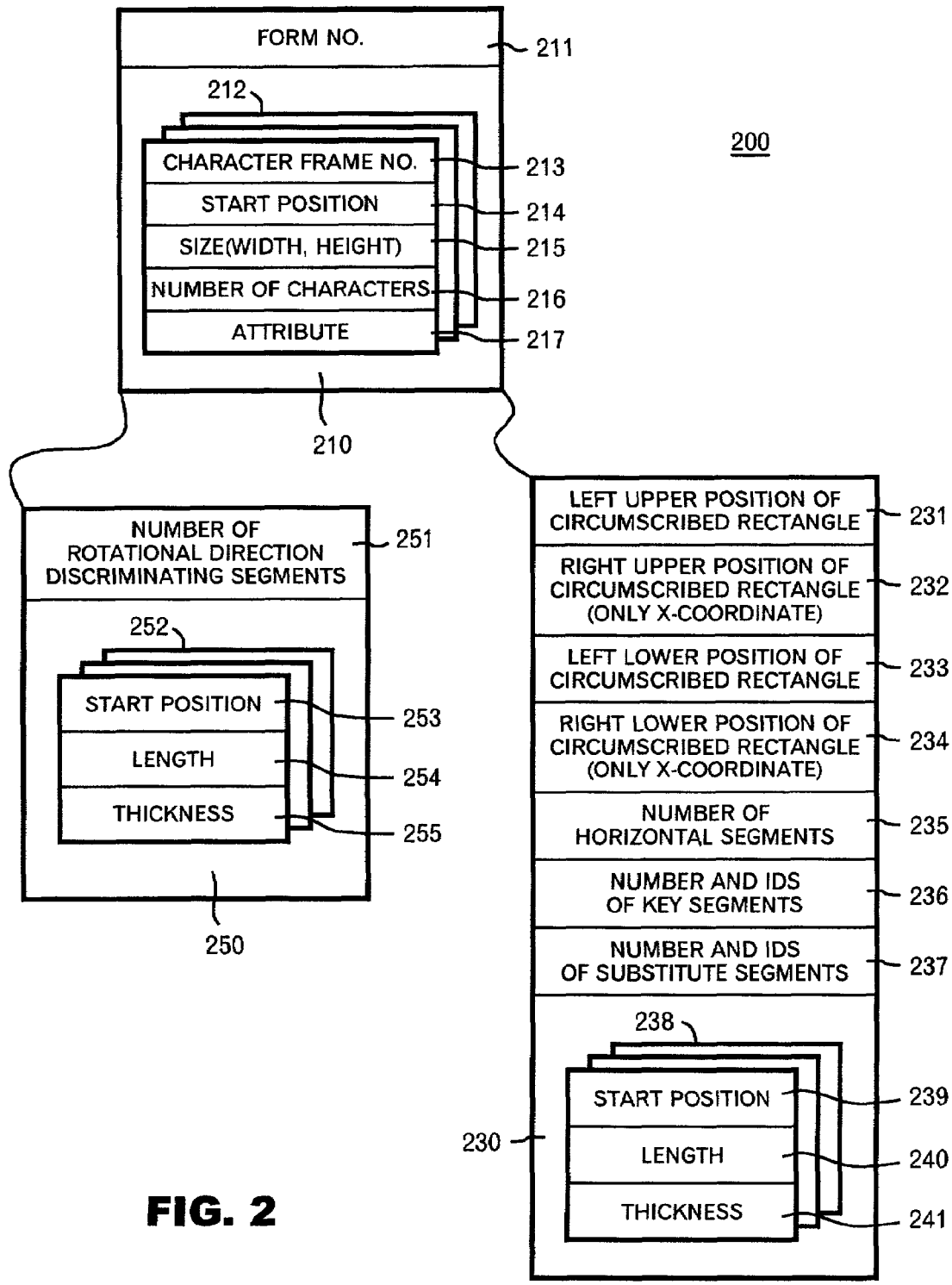
FIG. 2 is a conceptual diagram showing an example of the contents of a form definition structure which is well suited for application to the image processing system being the embodiment of the present invention.

FIG. 2 is a conceptual diagram showing an example of the contents of the form definition structure which is well suited for application to the image processing system of this embodiment. The form definition structure 200 has a form/character frame definition information part 210 corresponding to the form definition structure in the prior art, a circumscribed rectangle/horizontal segment definition information part 230, and a discriminatory segment definition information part 250. The definition structure storage unit 106 in the preferred embodiment of the present invention stores a plurality of such form definition structures 200 therein.

The form/character frame definition information part 210 includes a form No. 211, and the character frame information 212 of each of character frames included in the particular form. The character frame information 212 contains a character frame No. 213, the start position 214 of the character frame (the coordinate position of the left upper vertex of the character frame), the size (information on the width and height) 215 of the character frame, the number of characters 216, and an attribute 217. In general, a plurality of character frames are included in each form, and the character frame information 212 is managed every character frame.

The circumscribed rectangle/horizontal segment definition information part 230 is linked to the form/character frame definition information part 210 every form, and it includes the information items of the left upper position (x- and y-coordinates) 231 of a circumscribed rectangle, the right upper position (x-coordinate) 232 of the circumscribed rectangle, the left lower position (x- and y-coordinates) 233 of the circumscribed rectangle, the right lower position (x-coordinate) 234 of the circumscribed rectangle, the number 235 of horizontal segments, the number and IDs 236 of key segments, the number and IDs 237 of substitute segments, and segment information 238.

The number and IDs 236 of the key segments, the number and IDs 237 of the substitute segments, or both these regions may well contain cross-reference information for associating the segments. Owing to such a contrivance, a process for specifying the key segment from the substitute segment or for specifying the second key segment from the first key segment as will be explained later can be efficiently executed. The IDs (identification information) of the associated segments, the data of a positional difference from the associated segment, etc. may well be contained as the cross-reference information. Such information, however, may well be bestowed on the segment information 238 every segment.

The segment information 238 is managed every segment, and it includes the information items of the start position 239 of the segment, the length 240 thereof, and the thickness 241 thereof. The segment here can be one which is horizontally displayed in a state where the form 400 is displayed in its normal direction. Areas defining page marks/reference marks as are included in the prior-art form definition structure can also be diverted to the information 231–234 of the four corners in the circumscribed rectangle/horizontal segment definition information part 230.

The discriminatory segment definition information part 250 is linked to the form/character frame definition information part 210 every form, and it includes the number 251 of discriminatory segments, and segment information 252. The segment information 252 is managed every segment, and it includes the information items of the start position 253 of the segment, the length 254 thereof, and the thickness 255 thereof. The segment information items of the discriminatory segments can be recorded in association with rotational angles relative to the normal direction. By way of example, the information items 253–255 can be recorded as a horizontal segment in image data rotated 90 degrees relative to the normal direction, and as a horizontal segment in image data rotated 270 degrees. Alternatively, it is also allowed by way of example to record only the information of the horizontal segment in the image data rotated 90 degrees relative to the normal direction, and to obtain the segment information in the case of the rotation of 270 degrees, by computation from the data in the case of the rotation of 90 degrees.

Techniques for generating that part of the form definition structure which corresponds to the form/character frame definition information part 210 are known at the filing of the present application. In, for example, that form defining job (form definition structure generating job) of the OCR in which a character recognition program is caused to recognize a form for OCR as created anew, a classical method is such that the size, page marks, position correction marks (also called "_r OCR as created anew, a classical method is such that the size, page marks, position correction marks (also called "timing marks"), character field of the form, relative positions and sizes of characters in the form, and so forth are measured using a scale, and that the numerical values of the measurement are inputted, whereby a form definition structure can be generated. The method, however, is laborious for an operator (definition structure creator). Some improved methods have been proposed at present. An example is a system wherein, as stated in "_proposed at present. An example is a system wherein, as stated in WinReader Hand vl. 5 Users Manual, Setting of Field (p. 19, 20)" of Media Drive Corporation ("WinReader Hand" is a trademark of Media Drive Corporation), a blank form image is accepted by a scanner in case of a form of black frame, the image is displayed on a display device, all vertical lines and lateral lines in black are automatically detected, and an operator sets a character recognition field after having verified the proper detection of the straight lines.

Japanese Patent No. 3,113,827 assigned to the same assignee as that of the present application states a technique wherein the scanned image of a form including character frames is displayed on a display device, the interior of the leftmost character frame is clicked with a mouse every recognition field, and the interior of the rightmost character frame of the same field is subsequently clicked, thereby to automatically designate the field. With the technique, it is possible to reset the detected character frames and set attribute information after the run of a character frame detection program. When the field attribute is set, it is avoidable to misrecognize the numeral "0" in numeral items as the English letter "0". Another merit is that, since the number of sets to be compared decreases, recognition can be performed at high speed. Especially in handwritten character recognition, there are also characters difficult of discrimination, such as the numeral "0" and the English letter "0". Therefore, although the recognition is possible without employing the form definition structure which includes the attribute information, it is difficult to attain a speed and a correct recognition rate which are practicable, and the subsequent handling of recognized characters (such as an address, a name, and an amount of money) is liable to become obscure. Accordingly, a process for recognizing a form is usually constituted by the two steps of the creation of a form definition structure and the recognition of the actual form based thereon.

Also the present invention can be applied to the two steps of the creation of the form definition structure and the form identification/character recognition in the OCR process. Examples of applications of the present invention at the respective steps will be explained below.

Figure 3:
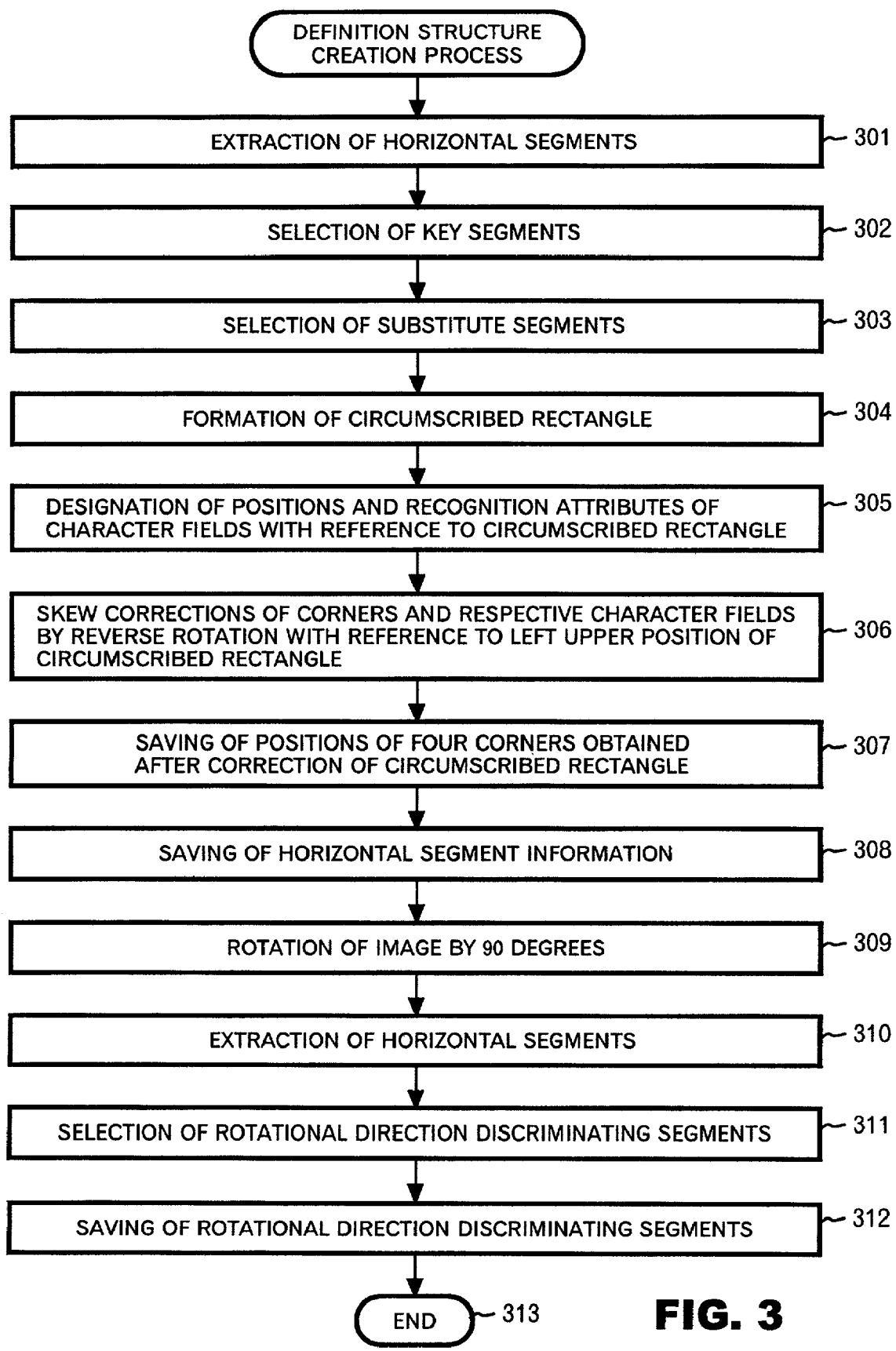
FIG. 3 is a flow chart showing an example of the flow of a form definition structure creation process.

FIG. 3 is a flow chart showing an example of the flow of a form definition structure creation process. First, the image data of a blank form is inputted by a scanner, a facsimile or the like. In the creation process for a form definition structure, the form is assumed to be displayed in its normal direction. In other words, it is assumed that, when the form has been inputted with a rotation of, e.g., 90 degrees or 270 degrees, it is subjected to a rotation correction so as to be displayed in the normal direction.

In the state where the image is displayed in the normal direction, horizontal segments are extracted from the image (step 301). It is one of the features of the present invention to extract the horizontal segments from the form and to base form identification on them. The reason therefor is that the extraction of the horizontal segments can be dealt with several times as fast as the extraction of vertical segments. In case of bitmap data, the horizontal segments can be extracted at high speed by scanning in a horizontal direction. On this occasion, limitations can be set to the length and thickness of each horizontal segment in order to avoid the influences of noise and any useless short segment forming a character or the like. The limitation is, for example, that any segment which is not longer than 7 mm or which is not thicker than 0.3 mm is ignored.

Figures 4, 5:
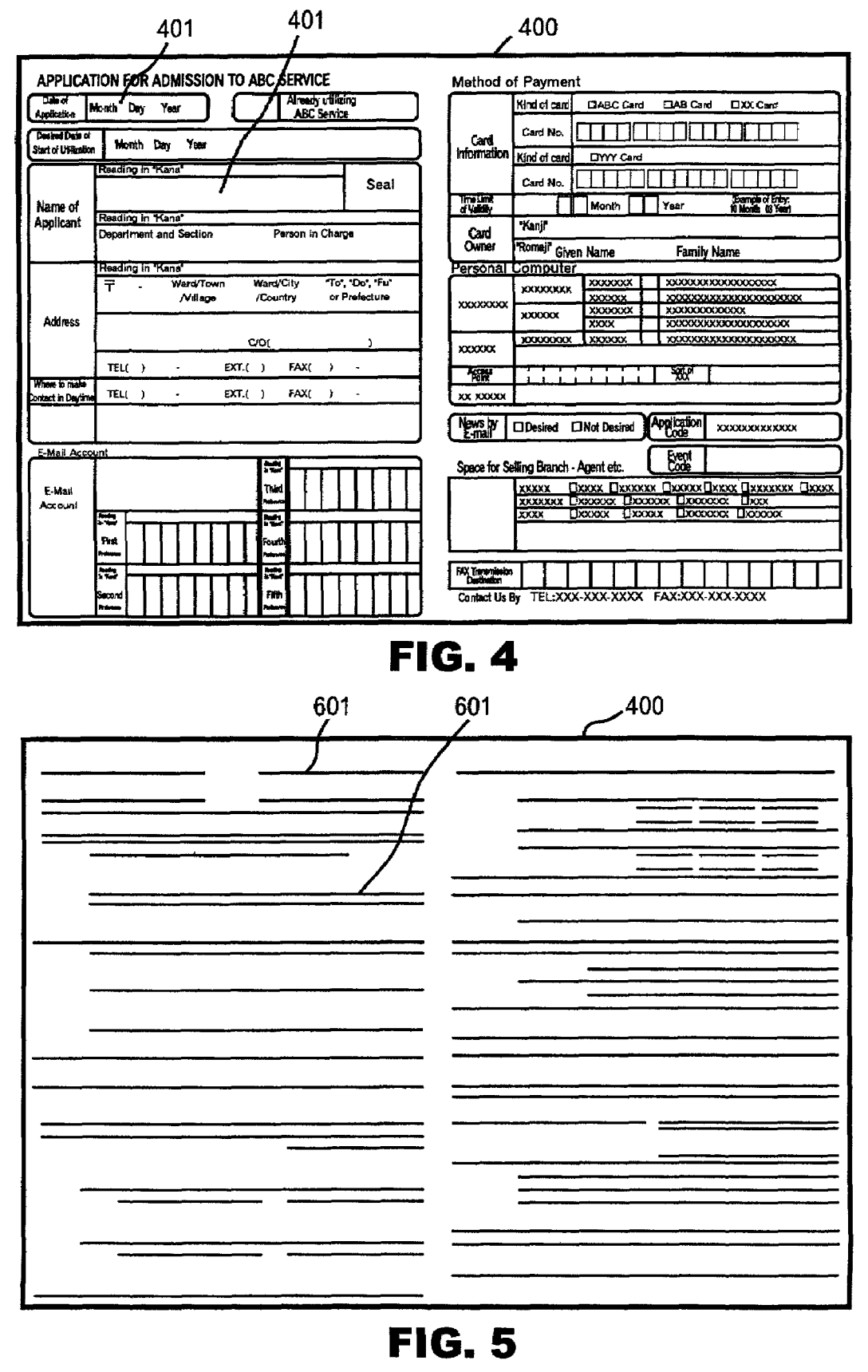

FIG. 4 is a diagram showing an example of the form for use in this embodiment. The form 400 has the size of, for example, A4-format paper and has a format in which characters are laterally written in a lengthwise direction. A large number of input regions 401 exist in the form 400. The illustrated form 400 is a blank form, and the characters are written into the input regions 401 as may be needed. Incidentally, it is a matter of course that the input region to which the reference numeral 401 is affixed is exemplary, and that the input regions are also existent at the other parts. The characters written into the input regions 401 become subjects for character recognition as will be explained later.

FIG. 5 is a conceptual diagram showing an example of a result obtained after the form in FIG. 4 has undergone the segment extraction at the step 301. Shown here is a state where almost all horizontal segments 601 in the form 400 have been extracted. Information items on the x- and y-coordinates of the start point and end point of each segment (in the middle of the line width thereof), and the thickness of each segment are held as information for specifying the segments. It is also effective that information items on the x- and y-coordinates of the start point of each segment, and the length and thickness of each segment are held as segment specifying information. IDs such as segment Nos. are affixed to the respective segments in order to identify key segments explained below.

Figure 6:
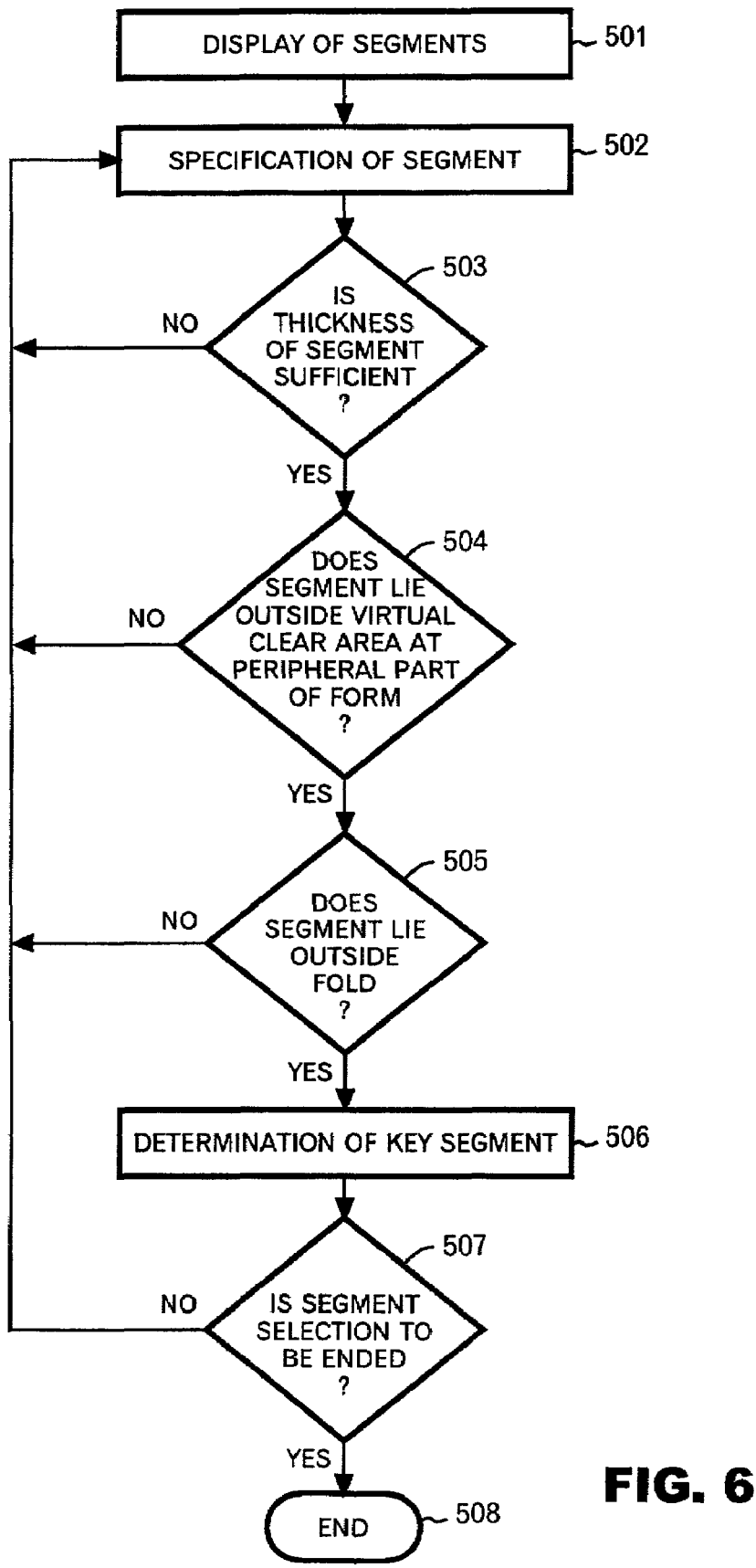
FIG. 6 is a flow chart showing an example of a procedure for selecting a key segment.

Subsequently, the key segments are selected from among the segments 601 extracted as shown in FIG. 5 (step 302). FIG. 6 is a flow chart showing an example of a procedure for selecting the key segment. The procedure for selecting the key segment will now be explained.

First, the segments are displayed on the display screen of a computer as shown in FIG. 5 (step 501). On this occasion, the form 400 in FIG. 4 may well be displayed as an overlay.

Subsequently, the operator specifies the key segment with a pointing device such as mouse (step 502). As regards criteria for the selection of the key segment, considering the fact that a circumscribed rectangle (virtual page marks) is generated on the basis of the key segments, this key segment should preferably be one which is extracted reliably and stably. Therefore, the key segment to be selected ought to have a sufficient thickness and to be immune against blur etc. in a case where the original sheet of paper of the form 400 has a fold, the segment often breaks at the part of the fold. Therefore, the key segment ought to be one which does not overlap the region of the fold. Considering the fact that the skew of the form 400 can be precisely corrected, it is preferable to select the segment whose end part lies near the peripheral edge of the form 400 to the utmost. However, when the segment lies excessively near the end part of the form 400, conversely a stable circumscribed rectangle cannot be generated. A clear area is an empty area which is to be afforded as a margin for coping with the lack of the end part of the form 400 and the skew correction. In this regard, a "virtual clear area"(namely, an area which is not empty, and which is necessary for coping with a lack ascribable to the facsimile header of a facsimile etc., and the skew and expansion/contraction of the form 400) ought to be positively set for a form which does not have a sufficient empty clear area at its peripheral part, like the form 400 as shown in FIG. 4. The operator designates any segment as a candidate with the mouse in consideration of these conditions.

The system decides if the designated segment has, at least, a predetermined thickness (step 503). When the judgment is "Yes", if the segment lies outside the virtual clear area at the peripheral part of the form 400 is further judged (step 504). When the judgment on the virtual clear area is also "Yes", if the segment lies outside the fold of the form 400 is further judged (step 505). When the judgment of the step 505 is also "_s also "Yes", that is, when all the three conditions are satisfied, the selected segment is determined as the key segment (step 506). The selected key segment is managed by recording its segment No. (segment ID). By the way, in a case where any of the judgments of the steps 503–505 is "No", the routine returns to the step 502 so as to be redone from the specification of the segment. After the determination of the segment, the system inquires of the operator as to whether the segment selection process is to be ended (step 507). In case of continuing the selection process, the routine returns to the step 502 so as to iterate the above process, and in case of ending the selection process, the routine is ended (step 508). In the above way, the key segment is selected from among the extracted horizontal segments.

Here has been explained the example in which the system automatically judges the selection criteria at the steps 503–505 as to the segment selected by the operator. All the judgments, however, may well be entrusted to the operator without causing the system to judge. Alternatively, it is also possible to adopt a method in which the operator is not let select the segment, but the criteria are judged at the steps 503–505 as to the respective segments extracted at the step 301, the segments having satisfied the requirements are ranked from the segment with its end part lying nearest the peripheral edge of the form 400, and the system automatically determines the segments of higher ranks as key segments. That is, the key segments may well be entirely determined by the system.

Subsequently, the substitute segments are selected (step 303). As will be explained later, the circumscribed rectangle is formed on the basis of the key segments in this embodiment. However, in a case where the key segment has failed to be detected, a situation arises where the circumscribed rectangle cannot be generated, and hence, the substitute segment is defined as the backup of the key segment in order to avoid the situation. The selection criteria of the substitute segment are substantially the same as those of the key segment. However, the segments having already been selected as the key segments are removed from subjects for the selection. A method for the selection is the same as the foregoing procedure shown in FIG. 6. It is also the same as in the case of the key segment selection that the substitute segments can be selected by the operator's operations only or can be automatically generated by the system.

Figures 7, 8:
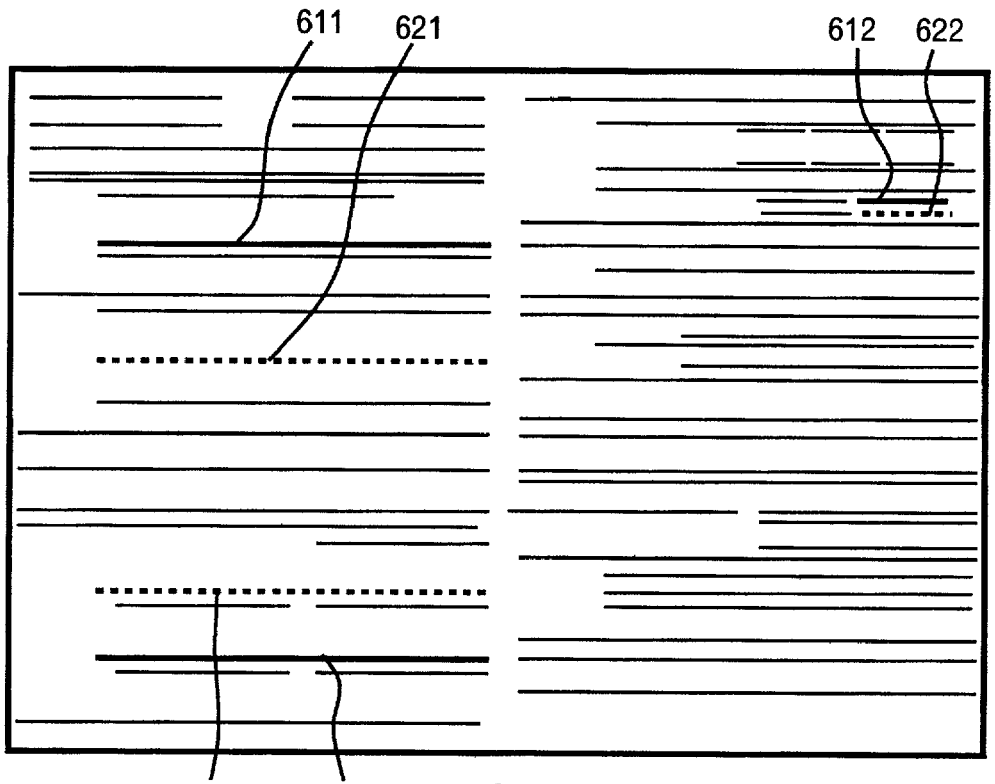
FIG. 7 is a conceptual diagram showing segments obtained after the key segments and substitute segments have been selected.
FIG. 8 is a diagram showing a virtual clear area and a fold region in overlapped fashion.

FIG. 7 is a conceptual diagram showing segments obtained after the key segments and the substitute segments have been selected. Among the segments shown in FIG. 5, segments 611, 612, 613 are selected as the key segments. Segments 621, 622, 623 are selected as the substitute segments. FIG. 8 is a diagram showing a virtual clear area and a fold region in overlapped fashion. The key segments 611, 612, 613 and the substitute segments 621, 622, 623 are selected so as to overlie neither the virtual clear area 631 at the peripheral part of the form 400 nor the fold region 632 of the form 400. The key segments 611, 612, 613 and the substitute segments 621, 622, 623 thus selected are expected to be substantially reliably extracted and recognized in an actual recognition process, and can be expected to reliably generate the stable circumscribed rectangle. Accordingly, even in a case where an actual clear area (empty space) does not exist at the peripheral part of the form 400, this form 400 can be reliably identified. a non-OCR form which is not designed for the OCR includes thin segments difficult of recognition in some cases. In this regard, such thin segments are avoided beforehand, and thick segments which will be reliably recognized are set as the key segments or the substitute segments, whereby the circumscribed rectangle can be reliably generated even for the non-OCR form. Moreover, any segment which might partially lack due to its position at the end part of the form or in the fold region thereof is avoided, and the segments which is free from such lacks are selected as the key segments or substitute segments, so that the circumscribed rectangle can be stably generated. Further, even if the key segments have failed to be detected, the generation of the circumscribed rectangle is permitted subject to the detection of the substitute segments. That is, redundancy is bestowed on the detection of the segments on which the generation of the circumscribed rectangle is based, so that the reliability of the circumscribed rectangle generation can be enhanced.

Although the example in which the three key segments and the three substitute segments are selected is shown in FIGS. 7 and 8, the numbers of the key segments and the substitute segments may well be two as long as the circumscribed rectangle of sufficient size can be generated.

Subsequently, the circumscribed rectangle is generated on the basis of the key segments, or the substitute segments at need (step 304). Before the generation of the circumscribed rectangle, an average skew value unique to the form 400 is computed from the set of horizontal segments extracted at the step 301. By way of example, the skew of each segment is obtained from the x- and y-coordinates of the start point and end point in the segment information, and the average value of such skews is set as an average skew angle. The circumscribed rectangle is generated having the angle of the average skew value.

Figure 9:
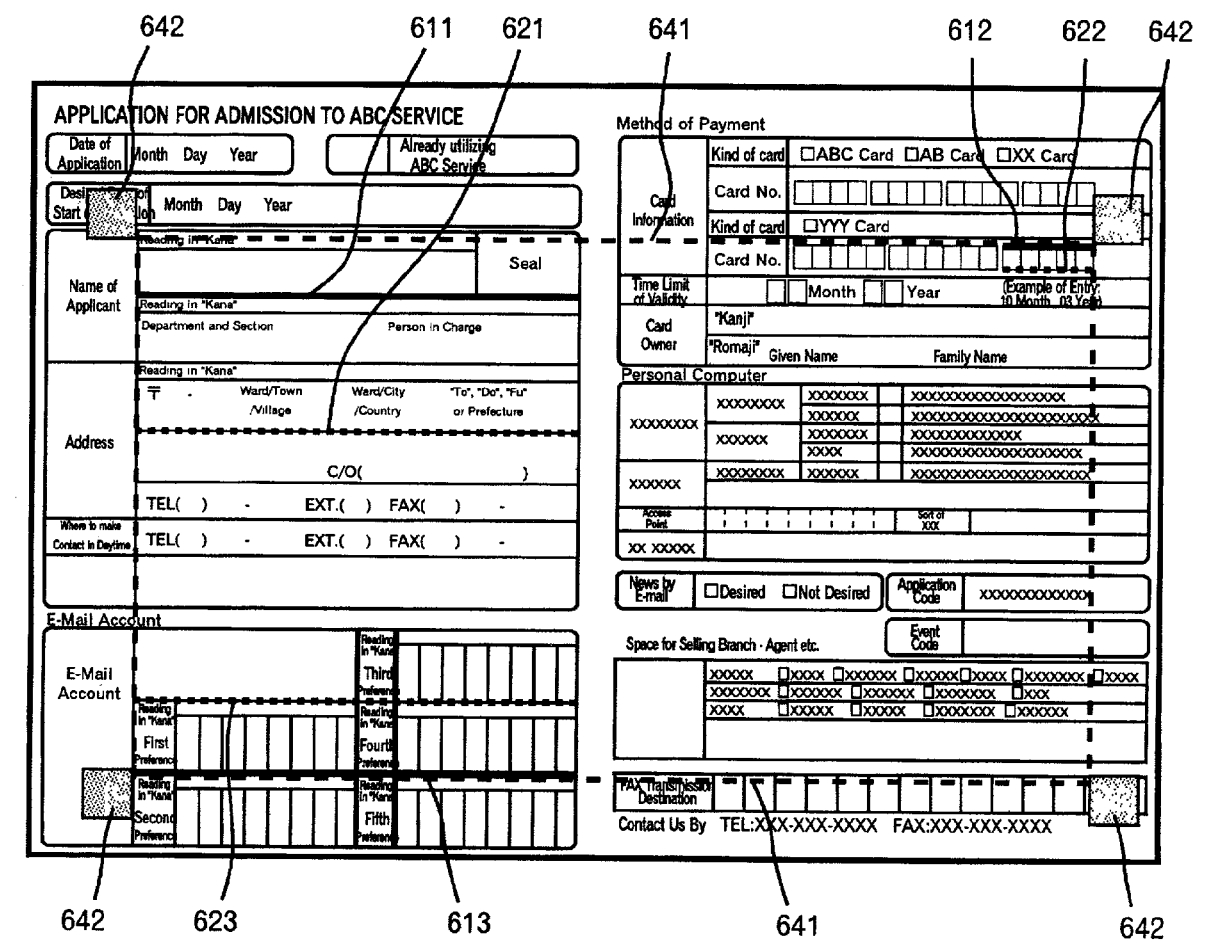

The circumscribed rectangle is generated as a rectangle including the key segments. The points of the four corners of the circumscribed rectangle are acquired as information for defining the circumscribed rectangle, from the information items of the minimum and maximum y-coordinates and minimum x-coordinate of the start points of the respective key segments and the maximum x-coordinate of the end points of the respective key segments. FIG. 9 is a conceptual diagram of the circumscribed rectangle which has been created by a process for forming the circumscribed rectangle. Virtual page marks 642 are generated at the respective vertices of the circumscribed rectangle 641. In a case where no segment exists at any vertex of the circumscribed rectangle, for example, at the right lower vertex of the circumscribed rectangle 641 in FIG. 9, the corner point is calculated with a linear equation by employing the maximum value or minimum value of the x-coordinates of the horizontal segments.

The positional information items of the horizontal segments, key segments and circumscribed rectangle obtained in this way are stored in the form definition structure in FIG. 2.

Subsequently, the positions and recognition attributes of character fields are designated with reference to the circumscribed rectangle (step 305). With the origin set at the left upper position of the circumscribed rectangle, the relative positions of character frames are determined. In this embodiment, only the form/character frame definition information part 210 is previously created as the form definition structure 200 in the prior art, and the circumscribed rectangle/horizontal segment definition information part 230 is added to the created form definition structure 200. Herein, the values of the x- and y-coordinates of the left upper position 231 of the circumscribed rectangle are subtracted from those of the x- and y-coordinates of the start position 214 of each character frame.

In this embodiment, the form/character frame definition information part 210 and the circumscribed rectangle/horizontal segment definition information part 230 are defined by the series of processes. Herein, the start position 214 of each character frame is extracted in such a way that a known program for detecting a character frame is run with a start point set at the left upper position 231 of the circumscribed rectangle extracted before.

The left upper position 231 and right upper position 232 of the circumscribed rectangle can be regarded and used as page marks, whereby a program using page marks in the prior art can be utilized without adding essential alterations.

Subsequently, the skew corrections of the corners and respective character fields are made by a reverse rotation with reference to the left upper position of the circumscribed rectangle (step 306). Using a rotational angle based on the skew value obtained before, the positions of the remaining three corners and character frames of the circumscribed rectangle are subjected to the computational reverse rotation corrections on the basis of the left upper position of the circumscribed rectangle. Thus, the positional information items of the four corners of the calculated circumscribed rectangle are substituted by the positional information items 231–234 of the four corners of the circumscribed rectangle of the form definition structure 200. In this manner, the theoretical skew corrections are made by only the so-called "mapping" of the positional information without rotating the image itself, so that the processing can be executed at high speed. the start position 214 of each character frame is substituted by information obtained after the skew correction.

Subsequently, the positions of the four corners after the correction of the circumscribed rectangle are saved (step 307). The positions of the four corners after the correction of the circumscribed rectangle are saved as the positional information items of the page marks hitherto used. Thus, the positional information items of the four corners after the correction can be diverted to a character frame detection logic which employs the page marks hitherto used, as virtual page marks.

Subsequently, horizontal segment information is saved (step 308). Various sorts of information, such as the number 235 of detected horizontal segments, the number and IDs 236 of key segments, the number and IDs 237 of substitute segments, start positions 239, lengths 240 and thicknesses 241, are saved in the definition structure shown in FIG. 2. The information items are used in case of the form identification. Incidentally, the numbers of the key segments and substitute segments need not always be saved. although the key segments and substitute segments are recorded as the segment IDs, their start positions, lengths and thicknesses may well be saved separately from the horizontal segments. Further, the substitute segments may well be saved as their positions relative to the key segments.

Subsequently, segments for discriminating the rotational directions of the image are defined. The image is rotated 90 degrees (step 309), and horizontal segments are extracted as to the rotated image in the same manner as at the step 301 (step 310).

Subsequently, the discriminatory segments are selected (step 311). Criteria for the selection of the discriminatory segments are similar to those in the case of the key segments (step 302). However, it is stipulated as an additional condition that the same segment or a similar segment is not existent at a position which is in rotational symmetry to the position of the segment to-be-selected with respect to the center of the image. The significance of the condition is obvious for the reason that, unless the condition is added, the rotational direction cannot be discriminated on account of rotational symmetry of 180 degrees.

Figure 10:
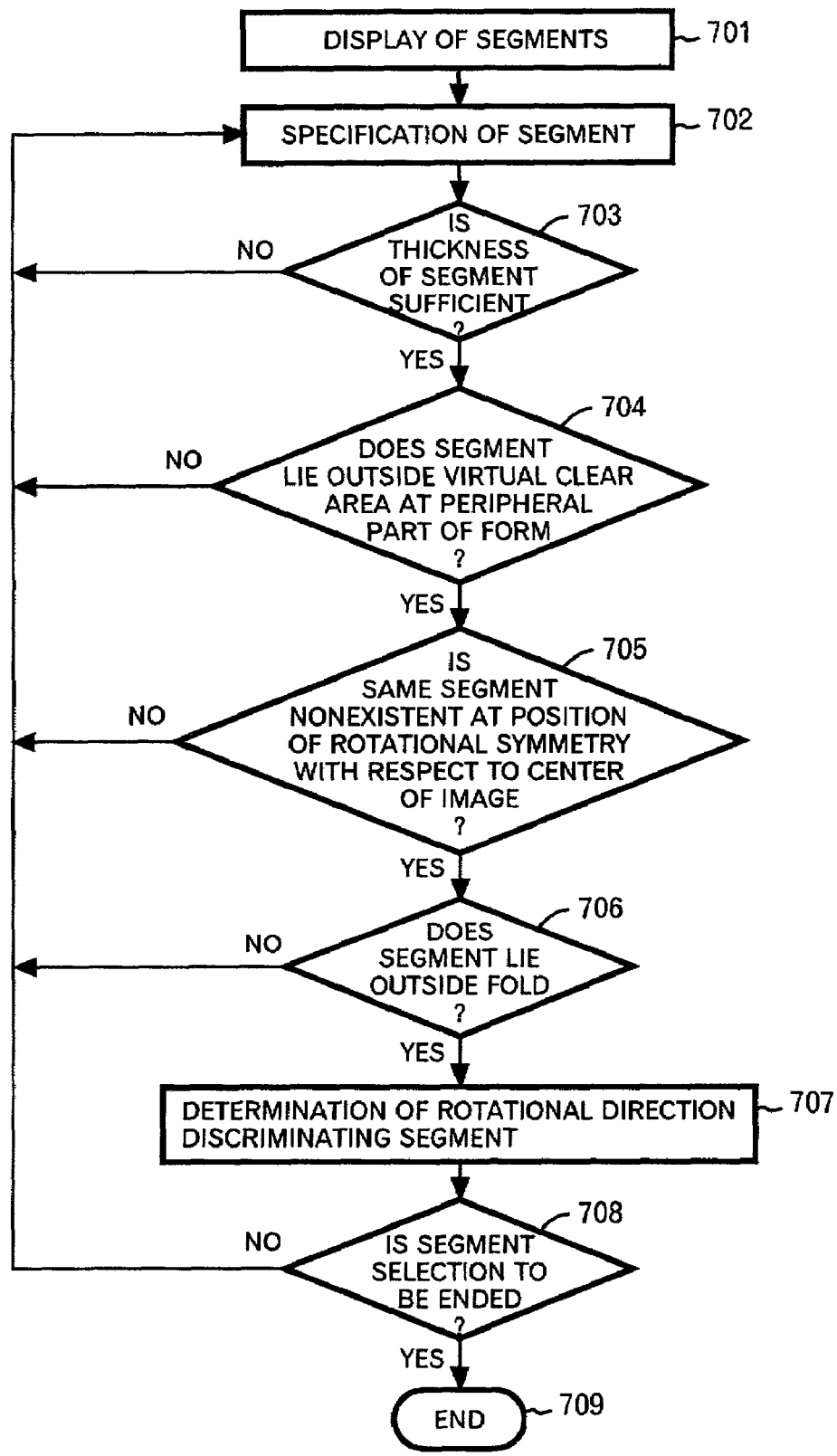
FIG. 10 is a flow chart showing an example of a procedure for selecting a discriminatory segment.

FIG. 10 is a flow chart showing an example of a procedure for selecting the discriminatory segment. First, extracted segments are displayed on the display screen of the computer (step 701). On this occasion, the form rotated 90 degrees may well be displayed as an overlay. Subsequently, the operator specifies the discriminatory segment with the pointing device such as mouse (step 702). The criteria for the selection of the discriminatory segment are the conditions stated before. The system judges if the designated segment has, at least, a predetermined thickness (step 703). When the judgment is "Yes", if the segment lies outside the virtual clear area at the peripheral part of the form 400 is further judged (step 704). When the judgment of the step 704 is also "Yes", if the same segment is nonexistent at the position of rotational symmetry of 180 degrees with respect to the center of the image is further judged (step 705). When the judgment of the step 705 is also "Yes", if the segment lies outside the fold of the form 400 is further judged (step 706). When the judgment of the step 706 is also "Yes", that is, when all the four conditions are satisfied, the selected segment is determined as the discriminatory segment (step 707). In a case where any of the judgments of the steps 703–706 is "No", the routine returns to the step 702 so as to be redone from the specification of the segment. After the determination of the segment, the system inquires of the operator as to whether the segment selection process is to be ended (step 708). In case of continuing the selection process, the routine returns to the step 702 so as to iterate the above process, and in case of ending the selection process, the routine is ended (step 709). In the above way, the discriminatory segment is selected from among the extracted horizontal segments.

Figure 11:
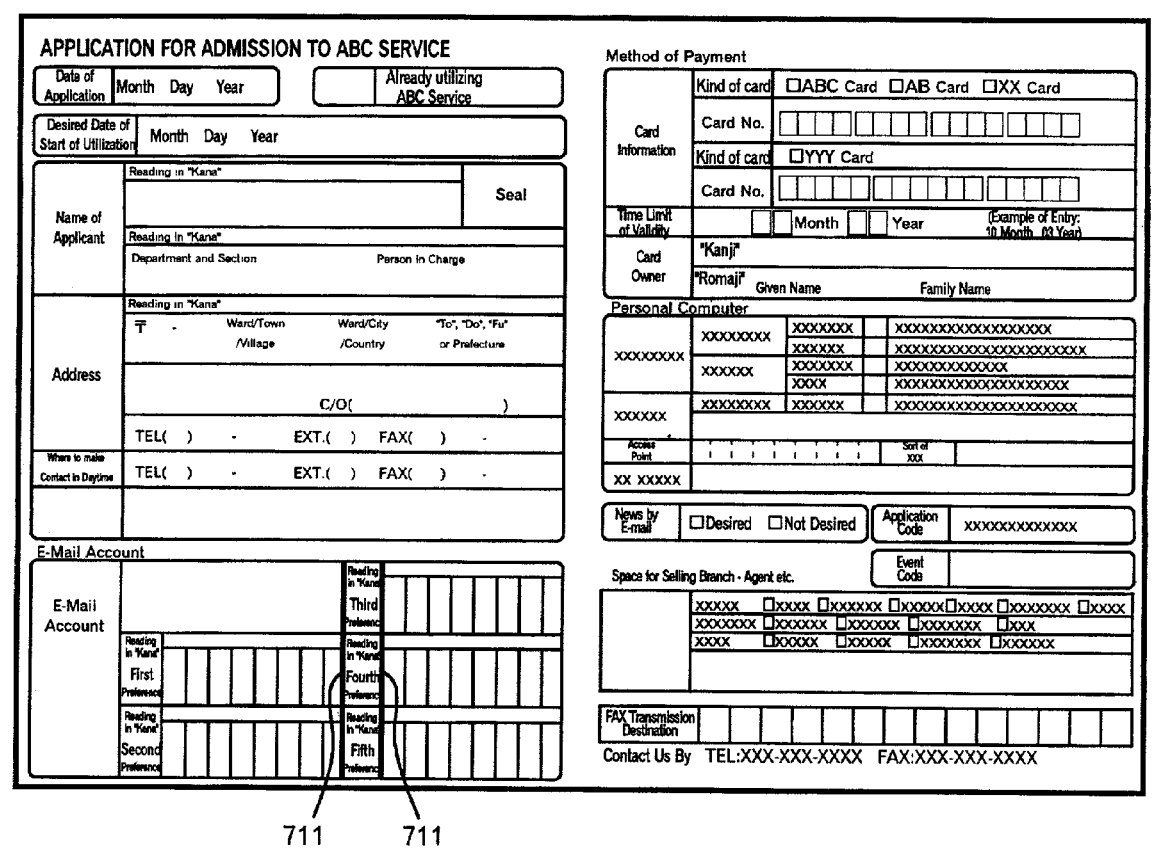

FIG. 11 is a diagram showing an example of a display presented after the process for selecting the discriminatory segments has ended. Segments 711 have been selected as the discriminatory segments.

It can be the same as in the case of the key segments that the discriminatory segments can be determined by the operator' selection operations only or that they can be automatically generated by the system.

Regarding the discriminatory segments selected and determined as stated above, information items such as the number of the segments and the start position, length and thickness of each segment are recorded in the discriminatory segment definition information part 250 in FIG. 2 (step 312).

In the above way, the information necessary for the form definition structure 200 is collected. The information of the form definition structure 200 is utilized by the actual recognition process.

Figure 12:
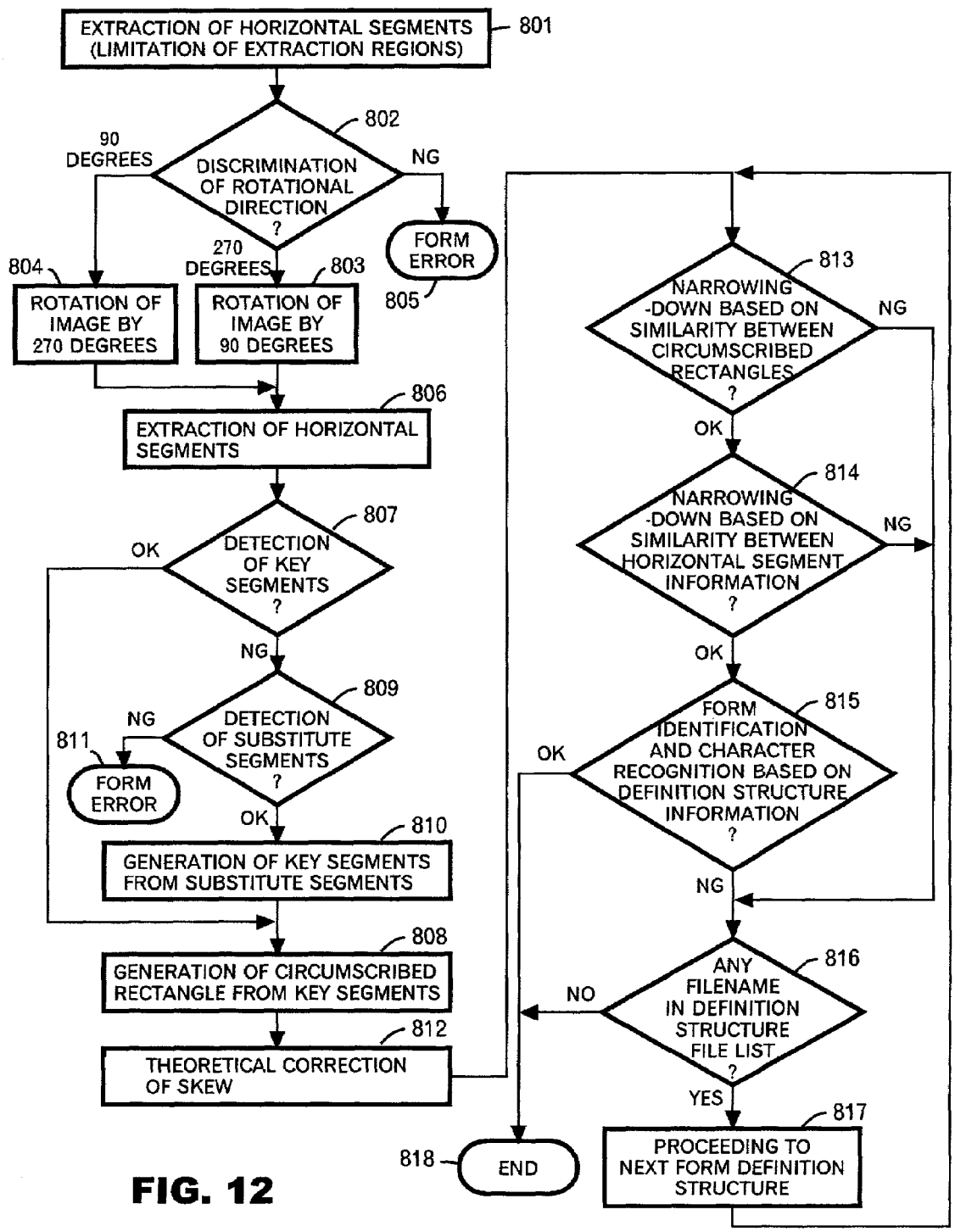
FIG. 12 is a flow chart showing an example of a form identification and character recognition process.

Next, a form identification and character recognition process will be explained. FIG. 12 is a flow chart showing an example of the form identification and character recognition process. By the way, this embodiment will be described assuming a case where a form having different vertical and lateral lengths, such as A4-format, in which characters are written laterally along the longer side (in the lateral direction) is inputted. It is also assumed that the image reading direction of the inputted form is as desired. In other words, it is assumed that the input image is inputted in a state where it is rotated 90 degrees or 270 degrees relative to its normal position.

Figure 13:
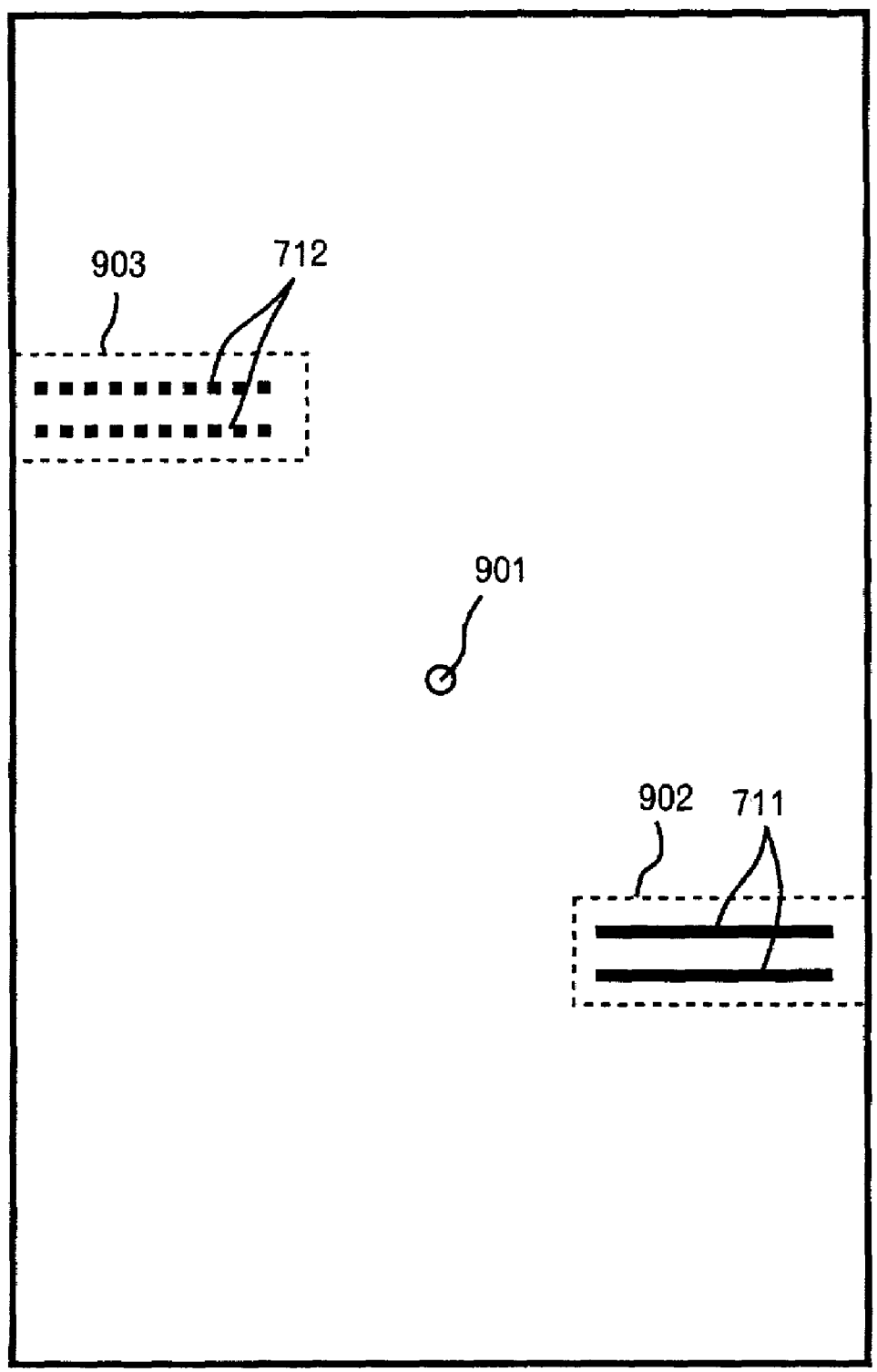
FIG. 13 is a diagram showing regions which are treated at a step 801.

First, horizontal segments are extracted in the state in which the input image is inputted (step 801). The horizontal segments to be extracted here are segments for discriminating the rotational direction of the image, and the extraction processing need not be performed for the whole form. FIG. 13 is a diagram showing regions which are treated at the step 801. When a certain form is supposed, a region where the discriminatory segments 711 may possibly exist can be assumed. Therefore, the horizontal segment extraction processing is performed for the region 902 in which the segments seem to exist, and a region 903 which lies at the position of 180-degree rotational symmetry to the region 902 with respect to the center of rotation 901. Thus, at this step, the whole form is not treated, but only part of the form is treated, so that the rate of rotational direction discrimination processing can be enhanced. In general, about 10% of the whole form may be treated, and the time period of the process can be shortened to about 10% as compared with that in the case of treating the whole form.

Subsequently, the processing for discriminating the rotational direction is performed (step 802). In a case where the segments recorded in the discriminatory segment definition information part 250 have successfully been detected in the region 902 in FIG. 13, it is meant that the form has been inputted in the state where it is rotated 90 degrees. By the way, in the description of this specification, the rotational direction takes plus values counterclockwise.

On the other hand, in a case where the segments recorded in the discriminatory segment definition information part 250 have successfully been detected in the region 903, it is meant that the form has been inputted in the state where it is rotated 270 degrees.

In the case of the judgment that the form has been inputted with the 90-degree rotation, the whole image is subjected to the processing of 270-degree rotation (step 804), and in the case of the judgment that the form has been inputted with the 270-degree rotation, the whole image is subjected to the processing of 90-degree rotation (step 803). When the discriminatory segments have successfully been detected in neither of the regions 902 and 903, a form error is judged (step 805). Then, the judgment on another form is continued, or the process is stopped.

As to the image data subjected to the rotation processing, horizontal segments are extracted (step 806). In the same manner as in the case of the form definition, only the horizontal segments which can be handled fast by horizontal scanning are detected from within the image of the form (image data). Also on this occasion, certain limitations are set to the length and thickness of each horizontal segment in order to avoid the influences of noise and any useless short segment forming a character or the like.

Subsequently, key segments are detected from among the extracted horizontal segments (step 807). When the key segments have failed to be detected, the detection of substitute segments is attempted (step 809). When the substitute segments have successfully been detected, the key segments are generated from the substitute segments (step 810), and the process is continued assuming the successful detection of the key segments. When even the substitute segments have failed to be detected, a form error is judged (step 811).

Alternatively, the detection of the key segments can be performed as stated below. Any of the key segments is selected as a first key segment, and if a segment corresponding to the first key segment has been extracted is judged. In detecting the first key segment, a range of somewhat large area is searched considering the shift of the blank form or the existence of a skew. That is, if the first key segment exists is checked in the range of comparatively large area centering around a region where this first key segment may possibly exist. When the first key segment has failed to be detected, a first substitute segment corresponding to the first key segment is searched for. The search for the first substitute segment is the same as in the case of the first key segment. When the first substitute segment has been detected, a position at which the first key segment ought to exist is specified from the relative position of the first substitute segment, and the subsequent processing is executed assuming that the first key segment exists at the specified position. When the first substitute segment has failed to be detected, a form error is judged. When the first key segment has successfully been detected, or when the first key segment has been specified by the first substitute segment, the relative position of a second key segment is computed with reference to the first key segment, and the second key segment is searched for in a narrowed region of comparatively small area as corresponds to the computed relative position. When the second key segment has failed to be detected, a second substitute segment is searched for as in the foregoing, and when the second key segment has successfully been detected, this second key segment is assumed to exist at a position at which it ought to exist. When the second substitute segment has failed to be detected, a form error is judged. The above processing is successively iterated until the key segments in a required number have been detected.

The above decision processing based on the relative positions may be executed by occasionally calculating these relative positions from the address positions, such as start positions, of the respective segments, or may well be executed by holding relative position data as differences in the circumscribed rectangle/horizontal segment definition information part 230 beforehand.

At a stage at which the key segments necessary for the generation of a circumscribed rectangle have successfully been detected, the circumscribed rectangle is generated from the key segments (step 808). The generation of the circumscribed rectangle is the same as in the case of the form definition. An average skew value unique to the form is computed from the set of extracted horizontal segments, and the circumscribed rectangle having the computed angle is formed.

Subsequently, the skew is theoretically corrected (step 812). In the same manner as in the case of the form definition, the positions of character frames, etc. are detected and corrected. Thus, even when the skews in the cases of the form definition and the recognition are different or involve a positional deviation, they can be coped with on an identical ideal image.

Subsequently, candidates for the form are narrowed down on the basis of the similarity between the circumscribed rectangles (step 813). The vertical and lateral lengths of the circumscribed rectangle formed are compared with those of the circumscribed rectangle calculated from the information items 231–234 of the four corners of the circumscribed rectangle of the form definition structure 200. On condition that the similarity is greater than a certain threshold value, the routine proceeds to the next processing. When the condition is not met, the similarity is compared with the circumscribed rectangle of another form definition structure (steps 816, 817). Incidentally, the form identification may well be made perfect in such a way that, in a case where the existence or nonexistence of the form ID on the form is checked and where in the existence of the form ID, it is recognized and then compared with the form No. 211 of the form definition structure 200.

Subsequently, candidates for the form are narrowed down on the basis of the similarity between the horizontal segment information (step 814). The horizontal segment extracted is compared with the horizontal segment information saved in the form definition structure, in relation to the positions and length within the rectangle. On condition that the similarity is greater than a certain threshold value, the routine proceeds to the comparison processing of the next horizontal segments. Incidentally, the number of horizontal segments shall not always agree finally. This is intended to relieve the influence of the erroneous detection or detection failure of any horizontal segment attributed to an entered character or the like. When the conditions of the similarity comparisons have been met, the routine proceeds to the next processing. When the conditions have not been met, the similarity comparison is made with another form definition structure.

Subsequently, the form identification and character recognition are performed on the basis of the definition structure information (step 815). The character recognition process is executed on the basis of the positional information and rotational angle of the four corners of the circumscribed rectangle formed, the positional information items and attribute information of the character frames of the form definition structure, etc. (The positional information items of the four corners of the circumscribed rectangle are set as the virtual page marks as in the case of the form definition, whereby the character frame detection logic based on the page marks hitherto used can be diverted.) Thereafter, in a case where the scanned form and the presumed form do not agree, the routine returns to the step 813 so as to examine another definition structure. Such an error of disagreement can take place in a case where the forms differ in spite of the agreement of the horizontal segments, or a case where the threshold value of the similarity between the horizontal segments is rough.

In case of the form which has met the conditions of the steps 813, 814 and 815, this form is judged as agreeing with the form of the particular definition structure, and the process of the OCR is executed. In case of the form which does not agree with any of the forms defined by all the form definition structures 200, it is judged that an unrecognizable form has been inputted, and error processing is executed.

As described above, according to the image processing system or image processing method of this embodiment, even the non-OCR form can be stably subjected to the form identification and character recognition. even in the case where any clear area (empty space) does not exist at the peripheral part of the form, the form identification and character recognition process can be stably executed. Moreover, even when the form has the fold or any other factor such as the blur or partial lack of the segment, it can be avoided. Accordingly, the form identification and character recognition can be stabilized and heightened in reliability.

Further, it is possible to heighten the speed of the processing of the image data inputted with the rotation of 90 degrees or 270 degrees. The method of this embodiment and the prior-art method based on the rotational direction discrimination will be compared below in terms of a processing time period in the case of a practicable form process. Here, conditions below are assumed for forms to-be-handled. The assumed conditions are general numerical values in the actual form process. More specifically, forms corresponding to the OCR ("OCR forms") are 50% of the total number of the forms to-be-handled. The OCR forms are rotated 90 degrees and 270 degrees at rates of 50%, respectively. A time period required for a process for rotating image data is 100 msec/form. A time period required for a process for detecting the horizontal segments of the whole form is 200 msec/form. A time period required for a process for detecting the horizontal segments for the rotational direction discrimination is 20 msec/form (since the whole form need not be searched, the processing time period is short). Processing time periods for form identification and rotational direction discrimination processes are negligible. Key segments are very rarely existent in the actual forms which are not the OCR forms. The above conditions are assumed.

In the case of the rotational direction discrimination explained in the Background art, the processing time period per form is as follows:

Processing time period of OCR form Rotated 90 degrees=25%×(100+200 msec)=75 msec Processing time period of OCR form Rotated 270 degrees=25%×(100+200 msec)×2=150 msec Processing time period of "non-OCR form" (which is not the OCR form)=50%×(100+200 msec)×2=300 msec Total processing time period=525 msec On the other hand, in the case of the rotational direction discrimination in this embodiment, the processing time period per form is as follows:

Processing time period of OCR form Rotated 90 degrees=25%×(20+100+200 msec)=80 msec Processing time period of OCR form Rotated 270 degrees=25%×(20+100+200 msec)=80 msec Processing time of Non-OCR form=50%×(20 msec)=10 msec Total processing time period=170 msec It is accordingly to be understood that the processing time period in this embodiment is curtailed to 32% as compared with that in the prior art.

Although the invention made by the inventors has been concretely described above in conjunction with the embodiment, it is needless to say that the present invention is not restricted to the foregoing embodiment, but that it can be variously modified and altered within a scope not departing from the purport thereof.

By way of example, although the input image data rotated 90 degrees or 270 degrees have been assumed in the embodiment, ones rotated 180 degrees may well be added. In this case, horizontal segment data for rotational angle detection as correspond to the 180-degree rotation are added.

The embodiment has referred to the case where the redundancy of the key segments and substitute segments is two, but it can also be extended to three or more by defining further segments substitutable for the substitute segments, or the likes.

Further, the embodiment has mentioned the example in which the form error is judged when neither the key segments nor the substitute segments have successfully been detected, but this aspect can be so extended that, in a case where all the key segments already registered cannot be detected, but where a circumscribed rectangle can be generated from some of the key segments, the circumscribed rectangle is generated from the key segments successfully detected. In this case, the circumscribed rectangle needs to be defined every combination of such key segments.

Still further, although the embodiment has mentioned the example including the thickness as the segment information, the thickness is not always necessary. The present invention can be performed when the start position and the length are specified as the segment information.

Yet further, although the embodiment has been chiefly described as the system and method, it is a matter of course that the system or method is implemented using the computer, and that the method or system of the present invention can be grasped as a computer program.

The embodiment may be modified that substitute segments similar to those of the key segments are defined for the discriminatory segments, and that, even when the discriminatory segments are not detected, the detection of the substitute segments is regarded as that of the discriminatory segments. Thus, redundancy is increased also at the step of rotational direction discrimination, and a probability at which the form identification error is judged can be lowered.

Also, as the third condition among the criteria for selecting the key segment or substitute segment, the embodiment has mentioned that the key segment or substitute segment does not overlap the fold, but it is a matter of course that the fold region 632 is not existent when the original sheet of paper of the form has no fold, so the judgment on the third condition need not be made.

It may now be appreciated that the present invention permits, even in case of a non-OCR form, the generation of stable virtual page marks and to stably identify the form. The detection of horizontal segments is made redundant, and the stable virtual page marks can be generated even in a case where the detection of the horizontal segments is difficult. Further, a technique for detecting the direction of a form rotation operation beforehand is provided, and a processing speed can be enhanced by suppressing the number of times of the rotation operations and the segment detection processes of the whole form to the minimum.

We claim:

1. An image processing method comprising:

extracting a plurality of horizontal segments from given image data;

detecting horizontal segments which correspond to predefined key segments, from among the plurality of horizontal segments;

generating a circumscribed rectangle which is circumscribed to the horizontal segments corresponding to the key segments; and selecting one form from among form definition structures in which definition information of respective forms is recorded, by utilizing position information, such as vertex positions of the generated circumscribed rectangle;

wherein said key segments are predefined in accordance with criteria which permit the form to be stably selected, and they satisfy a first condition that a thickness of said each key segment is not less than a predetermined threshold value, a second condition that said each key segment doesn't lie in a virtual clear area at a peripheral part of said form, and a third condition that said each key segment lies outside a fold region of said form if any.

2. An image processing method according to claim 1, wherein if said horizontal segments corresponding to said key segments cannot be detected, the method includes:

detecting horizontal segments which correspond to substitute segments defined for the respective key segments; and generating said circumscribed rectangle based on information of the substitute segments;

wherein said substitute segments are predefined in accordance with the same criteria as those of said key segments.

3. An image processing method according to claim 2, wherein if the horizontal segments corresponding to said substitute segments have been detected, it is assumed that horizontal segments exist at positions at which the corresponding key segments ought to exist and which are computed from relative positions of said substitute segments, and a circumscribed rectangle which is circumscribed to the assumed horizontal segments is generated.

4. An image processing method according to any of claim 1, further comprising recognizing characters included in the image data, by reference to the definition information of the selected form.

5. An image processing method comprising:

extracting a horizontal segment from given image data;

judging if the extracted horizontal segment corresponds to a predefined segment for a rotational direction ("discriminatory segment), so as to determine the image rotational direction;

rotating the image data in the determined rotational direction; and identifying a form which corresponds to said image data, and if necessary, further recognizing characters included in said image data, by reference to definition information of the form;

wherein said discriminatory segment is predefined in accordance with criteria which permit said form to be stably selected, and it satisfies a first condition that a thickness of said discriminatory segment is not less than a predetermined threshold value, a second condition that said discriminatory segment doesn't lie in a virtual clear area at a peripheral part of said form, a third condition that said discriminatory segment lies outside a fold region of said form if any, and a fourth condition that a segment similar to said discriminatory segment is nonexistent at a position of 180-degree rotational symmetry with respect to a center of said form.

6. An image processing method according to claim 5, wherein said horizontal segment is extracted from within a partial region of said image data in which said discriminatory segment ought to exist, and a region which is in 180-degree rotational symmetry to the partial region.

7. An image processing method according to claim 6, comprising:

detecting a horizontal segment which corresponds to a substitute segment defined every rotational direction discriminating segment, if said horizontal segment corresponding to said discriminatory segment cannot be detected; and judging that said discriminatory segment has been detected, if the horizontal segment corresponding to the substitute segment has been detected.

8. An image processing system comprising:

means for extracting a plurality of horizontal segments from given image data;

means for detecting horizontal segments which correspond to predefined key segments, from among the plurality of horizontal segments;

means for generating a circumscribed rectangle which is circumscribed to the horizontal segments corresponding to the key segments;

form definition structures in which definition information of respective forms is recorded; and means for selecting one form from among the form definition structures, by utilizing position information, such as vertex positions of the generated circumscribed rectangle;

wherein said key segments are predefined in accordance with criteria which permit the form to be stably selected, and they satisfy a first condition that a thickness of said each key segment is not less than a predetermined threshold value, a second condition that said each key segment doesn't lie in a virtual clear area at a peripheral part of said form, and a third condition that said each key segment lies outside a fold region of said form if any.

9. An image processing system according to claim 8, comprising:

means for detecting horizontal segments which correspond to substitute segments defined for the respective key segments, if said horizontal segments corresponding to said key segments cannot be detected; and means for generating said circumscribed rectangle based on information of the substitute segments;

wherein said substitute segments are predefined in accordance with the same criteria as those of said key segments.

10. An image processing system according to claim 9, wherein if the horizontal segments corresponding to said substitute segments have been detected, it is assumed that horizontal segments exist at positions at which the corresponding key segments ought to exist and which are computed from relative positions of said substitute segments, and a circumscribed rectangle which is circumscribed to the assumed horizontal segments is generated.

11. An image processing system according to claim 8, further comprising means for recognizing characters included in the image data, by reference to the definition information of the selected form.

12. An image processing system comprising:

means for extracting a horizontal segment from given image data;

means for judging if the extracted horizontal segment corresponds to a predefined segment for a rotational direction ("discriminatory segment"), so as to determine the image rotational direction;

means for rotating the image data in the determined rotational direction; and means for identifying a form which corresponds to said image data, and if necessary, further recognizing characters included in said image data, by reference to definition information of the form;

wherein said discriminatory segment is predefined in accordance with criteria which permit said form to be stably selected, and it satisfies a first condition that a thickness of said discriminatory segment is not less than a predetermined threshold value, a second condition that said discriminatory segment doesn't lie in a virtual clear area at a peripheral part of said form, a third condition that said discriminatory segment lies outside a fold region of said form if any, and a fourth condition that a segment similar to said discriminatory segment is nonexistent at a position of 180-degree rotational symmetry with respect to a center of said form.

13. An image processing system according to claim 12, wherein said horizontal segment is extracted from within a partial region of said image data in which said discriminatory segment ought to exist, and a region which is in 180-degree rotational symmetry to the partial region.

14. An image processing system according to claim 13, comprising:
  means for detecting a horizontal segment which corresponds to a substitute segment defined every rotational direction discriminating segment, if said horizontal segment corresponding to said discriminatory segment cannot be detected; and
  means for judging that said discriminatory segment has been detected, if the horizontal segment corresponding to the substitute segment has been detected.

15. A computer-executable program stored on a computer readable medium which causes a computer to implement the functions of:
  extracting a plurality of horizontal segments from given image data;
  detecting horizontal segments which correspond to predefined key segments, from among the plurality of horizontal segments;
  generating a circumscribed rectangle which is circumscribed to the horizontal segments corresponding to the key segments;
  selecting one form from among form definition structures in which definition information of respective forms is recorded, by utilizing position information, such as vertex positions of the generated circumscribed rectangle; and
  recognizing characters included in the image data, by reference to the definition information of the selected form;
  wherein said key segments are predefined in accordance with criteria which permit said form to be stably selected, and they satisfy a first condition that a thickness of said each key segment is not less than a predetermined threshold value, a second condition that said each key segment doesn't lie in a virtual clear area at a peripheral part of said form, and a third condition that said each key segment lies outside a fold region of said form if any.

16. A computer-executable program stored on a computer readable medium which causes a computer to implement the functions of:
  extracting a horizontal segment from given image data;
  judging if the extracted horizontal segment corresponds to a predefined segment for a rotational direction ("discriminatory segment"), so as to determine the image rotational direction;
  rotating the image data in the determined rotational direction; and
  identifying a form which corresponds to said image data, and recognizing characters included in said image data, by reference to definition information of the form;
  wherein said discriminatory segment is predefined in accordance with criteria which permit said form to be stably selected, and it satisfies a first condition that a thickness of said discriminatory segment is not less than a predetermined threshold value, a second condition that said discriminatory segment doesn't lie in a virtual clear area at a peripheral part of said form, a third condition that said discriminatory segment lies outside a fold region of said form if any, and a fourth condition that a segment similar to said discriminatory segment is nonexistent at a position of 180-degree rotational symmetry with respect to a center of said form.

* * * * *